(12) United States Patent
Etheridge et al.

(10) Patent No.: US 8,082,367 B2
(45) Date of Patent: Dec. 20, 2011

(54) DIFFERENTIAL TIME SYNCHRONIZATION OF INTELLIGENT ELECTRONIC DEVICES

(75) Inventors: Hal Etheridge, Brentwood Bay (CA); Douglas Scharmann, Victoria (CA)

(73) Assignee: Schneider Electric USA, Inc., Palatine, IL (US)

( * ) Notice: Subject to any disclaimer, the term of this patent is extended or adjusted under 35 U.S.C. 154(b) by 156 days.

(21) Appl. No.: 12/507,878

(22) Filed: Jul. 23, 2009

(65) Prior Publication Data

US 2011/0022734 A1    Jan. 27, 2011

(51) Int. Cl.
*G06F 15/16* (2006.01)
(52) U.S. Cl. .................. 709/248; 709/203; 370/507
(58) Field of Classification Search ............ None
See application file for complete search history.

(56) References Cited

U.S. PATENT DOCUMENTS

| | | | | |
|---|---|---|---|---|
| 6,401,054 B1 * | 6/2002 | Andersen | ............... | 702/179 |
| 6,650,249 B2 * | 11/2003 | Meyer et al. | ............... | 340/870.28 |
| 6,662,124 B2 * | 12/2003 | Schweitzer et al. | ............... | 702/65 |
| 6,671,635 B1 * | 12/2003 | Forth et al. | ............... | 702/61 |
| 6,751,562 B1 * | 6/2004 | Blackett et al. | ............... | 702/61 |
| 6,778,099 B1 * | 8/2004 | Meyer et al. | ............... | 340/870.02 |
| 7,664,869 B2 * | 2/2010 | Baker et al. | ............... | 709/230 |
| 2007/0014313 A1 * | 1/2007 | Bickel et al. | ............... | 370/503 |
| 2010/0324845 A1 * | 12/2010 | Spanier et al. | ............... | 702/62 |
| 2011/0135047 A1 * | 6/2011 | Tournier et al. | ............... | 375/356 |

FOREIGN PATENT DOCUMENTS

| | | | | |
|---|---|---|---|---|
| KR | 2010101998 A | * | 9/2010 | |
| KR | 2010125748 A | * | 12/2010 | |
| WO | WO 99/65169 A1 | * | 12/1999 | |

* cited by examiner

*Primary Examiner* — Jeffrey R Swearingen

(57) ABSTRACT

In a utility monitoring system, a network of intelligent electronic devices (IEDs), including a master IED that receives master clock information from a global positioning system, includes a differential time synchronization (DTS) algorithm for automatically adjusting the corresponding clocks of each of the IEDs to be synchronized with the master clock information. A controller coupled to the network communicates instructions to the IEDs to collect frequency variation data. A known data alignment algorithm determines a point of alignment between two sets of frequency variation data, and the controller determines based on the data alignment algorithm output a time differential representing a time offset between the IED's clock and the master clock information. The time differential is communicated to the target IED, which advances or retards its clock based on the time differential.

19 Claims, 4 Drawing Sheets

DIFFERENTIAL TIME SYNCHRONIZATION OF INTELLIGENT ELECTRONIC DEVICES

FIELD OF THE INVENTION

This invention relates generally to methods of time synchronizing clocks of intelligent electronic devices to a common time reference by sending a time differential to wayward clocks.

BACKGROUND

Normally, a network of intelligent electronic devices (IEDs) will introduce a delay while messages are communicated through the network. Devices and protocols conventionally attempt to compensate for this delay by (a) making the network "fast" (i.e., reducing the communications delay to an insignificant proportion of the overall error), or (b) modeling the network to determine what the delay is and incorporating the estimated delay in the absolute time. Each of these conventional methods has drawbacks. The first method is not always possible, particularly for wide area networks spanning a large geographic area. The first method can also be expensive because a faster, high bandwidth, low latency network is needed to maintain accurate time-synching, but such a network may be entirely too advanced for an implementation where a low speed, low bandwidth, high latency network would otherwise be entirely sufficient. In the second method, a more accurate time synchronization message can be obtained versus the first method, but any variability in the communication latency of the network will increase the time error of the message. Because the communication latency variability in IED networks can be and commonly is larger than the acceptable error, the second method may not meet the accuracy requirements.

Clocks are known to shift over time and even though they may be synchronized at one point in time, eventually they fall out of synch and need to be resynchronized. In utility systems, it is known to synchronize the clocks of IEDs by sending data indicative of an absolute time reference, but this data is susceptible to the same communication delays and latencies in the network, so by the time the new time reference is received, the attendant delay in network communications and processing creates a slight offset between the device's clock and the master clock. Synchronization among IEDs in a utility system is important at least for critical event reporting and alarming. When multiple events occur very close in time to one another, it is important to determine which event was critical. Out-of-synch clocks exacerbate the ability to report accurately sequence-of-events and to diagnose problems associated therewith.

What is needed, therefore, is a more accurate method of synchronizing IEDs in a utility system, one that is immune from network or processing delays and latencies. Aspects of the present disclosure are directed to addressing this and other needs.

BRIEF SUMMARY

The time synchronization aspects disclosed herein differ from conventional time synchronization methods used in utility monitoring systems in that instead of transmitting an absolute time reference to devices whose clocks have drifted away from a reference clock, a time differential is sent instead, which is immune from communication and processing delays that can introduce an error in the absolute time reference. These aspects eliminate that error and allows wide geographic area synchronization of numerous devices from a single accurate time source, which may obtain its reference clock from a global positioning system or other reliable source of accurate timekeeping.

The foregoing and additional aspects of the present invention will be apparent to those of ordinary skill in the art in view of the detailed description of various embodiments, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

Figure 1:
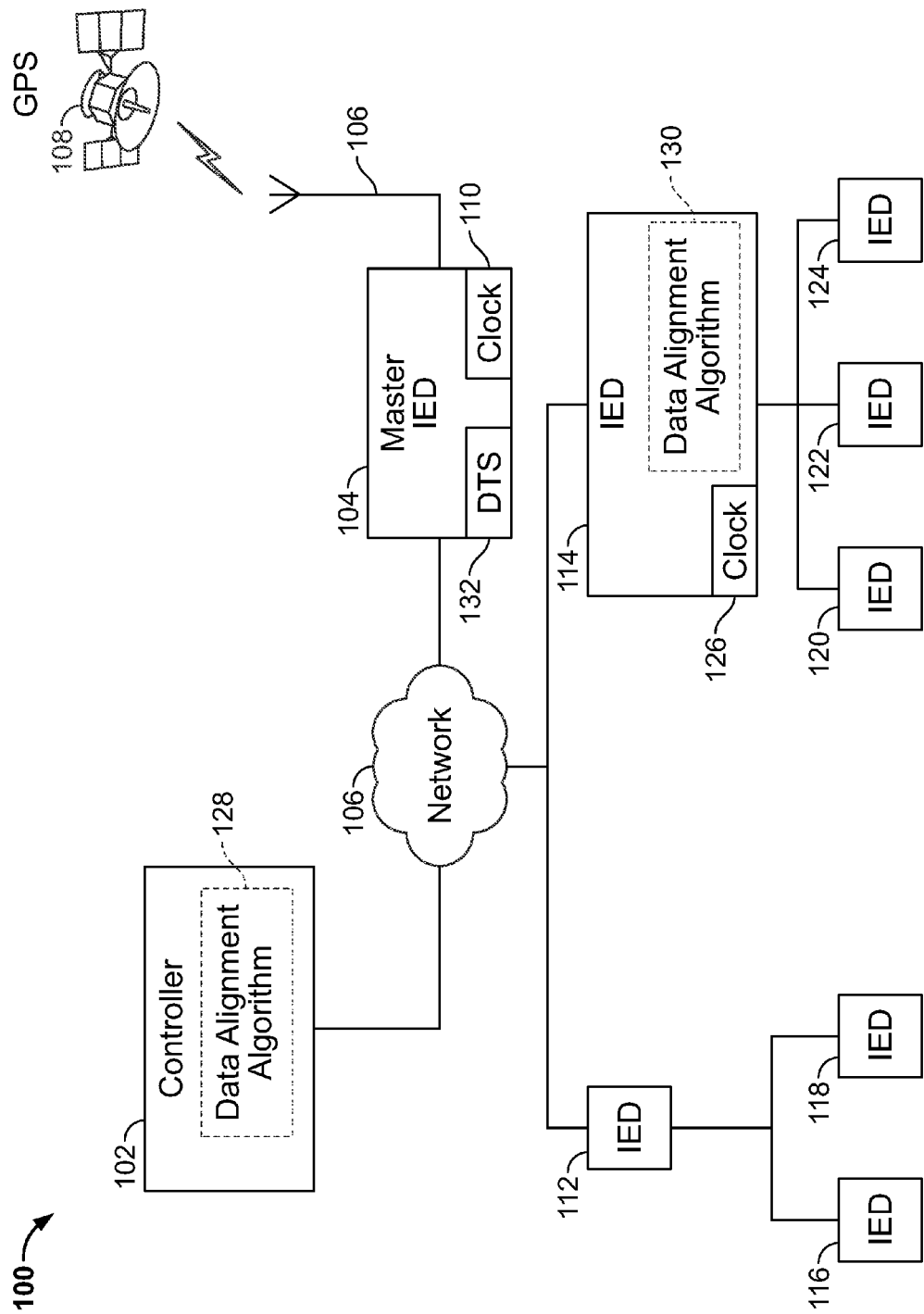
FIG. 1 is a functional block diagram of a utility monitoring system that incorporates a differential time synchronization module according to an aspect of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1 is a functional block diagram of a utility monitoring system 100 that includes an electronic controller 102 coupled to a master intelligent electronic device (IED) 104 via a conventional network 106, such as the Internet or a private area network. The controller 102 can be conventionally part of a computer, such as a server. The master IED 104 includes a conventional antenna 106 that receives master time information (e.g., any combination of one or more of month, day, year, hour, minute, second, fraction of a second, time zone) from a time source, such as a global positioning system (GPS) 108. The master IED 104 includes a clock 110 that is synchronized with the time information received from the GPS 108 such that the clock 110 and the clock for the GPS 108 report the same time simultaneously. A plurality of IEDs 112-124 are also coupled to the controller 102 via the network 106. The IEDs 112-124 also each include a clock, such as the clock 126 shown in the IED 114. The other clocks for the other IEDs 116-124 are not shown for ease of illustration. The controller 102 includes a conventional electronic memory device that stores a data alignment algorithm 128 as described in commonly assigned and co-pending U.S. application Ser. No. 11/174,099, filed Jul. 1, 2005, entitled "Automated Precision Alignment of Data in a Utility Monitoring System," the content of which is incorporated herein by reference in its entirety. Optionally, a data alignment algorithm 130 can also or alternately be stored in a memory device on any of the IEDs 112-124, such as the IED 114 shown in FIG. 1. Although the master IED 104 is shown receiving a reference clock time from a GPS 108, in other implementations, a reference clock time can be based upon the network time protocol (NTP) or any other reliable source of timekeeping.

Briefly, the data alignment algorithm 128, 130 aligns data measured by IEDs coupled to a monitoring system. The algorithm 128, 130 receives, at the controller 102, which is remote from the IEDs 104, 112-124, reference signal data from a master IED 104. The reference signal data represents frequency/amplitude/phase variations in a characteristic of the utility being measured by the master IED 104 for a predetermined number of cycles. For example, in the case of a power monitoring system, the frequency variations occur in the current or voltage from an electric grid. The master IED 104 stores a reference count associated with each of the cycles sensed by the master IED 104. The algorithm 128, 130 receives, at the controller 102, second signal data from the IED 114. The second signal data also represents frequency/amplitude/phase variations in a characteristic (e.g., current, voltage) of the utility (e.g., power) being measured by the IED 114 for a predetermined number of cycles. The IED 114 stores a second count associated with each of the number of cycles sensed by the IED 114. The algorithm 128, 130 automatically aligns the reference signal data with the second signal data to a common reference point in the respective current or voltage sensed by the master IED 104 and the IED 114 by: computing correlation coefficients each produced by a cross-correlation algorithm based on at least part of the reference signal data and at least part of the second signal data until one of the correlation coefficients produced by the cross-correlation algorithm satisfies a criterion; and in response to one of the correlation coefficients satisfying the criterion, associating the reference count associated with the common reference point with the second count associated with the common reference point. The criterion can include the correlation coefficient corresponding to a maximum correlation coefficient produced by the cross-correlation algorithm. The common reference point can correspond to a zero crossing in the measured current or voltage. The reference count and the second count can each correspond to the cycle count number associated with the common reference point. From the difference in cycle counts, a time differential can be calculated in seconds by dividing the cycle count difference by the fundamental frequency of the monitoring system (e.g., 60 Hz). For example, a cycle count offset of 15 cycles would result in a time differential of 250 milliseconds. The lagging clock would have to be increased by 250 milliseconds to bring both clocks into mutual synchronization.

When the clock 110 of the master IED 104 and the clock 126 of the IED 114 are not synchronized (i.e., reporting different time information at the same moment in time), such that one of the clocks lags or leads the other, a differential time synchronization (DTS) module or algorithm 132 as described further herein determines from the output of the data alignment algorithm 128, 130 a difference indicative of the offset in time between the two clocks and causes that difference to be communicated to the clock 126, which might be lagging or leading the clock 110 of the master IED 104. A number of significant problems can occur when the clocks of the IEDs 112-124 are not synchronized. Reporting and analysis of the measured data from the IEDs 112-124 becomes difficult, unwieldy, inaccurate, and time-consuming. For example, when two events or anomalies occur on the monitoring system nearly simultaneously, a time offset between clocks can result in different IEDs 112-124 reporting the same event at different times, leading to confusion as to which of the two events are actually being reported. It is important to emphasize that the DTS algorithm 132 does not send the absolute time reference, but rather a difference or time offset indicative of how much time the target device needs to add or subtract from its own clock to synchronize its clock with the clock 110 of the master IED 104. As a result, the synchronization occurs independently of any communication or other processing delays in the network 106 between the master IED 104 and the target IED 112-124. Although the DTS algorithm 132 is shown stored in a memory of the master IED 104, the DTS algorithm 132 can also be stored in a memory of the controller 102 or in a memory of any of the other IEDs 112-124 in the monitoring system 100.

Figure 2:
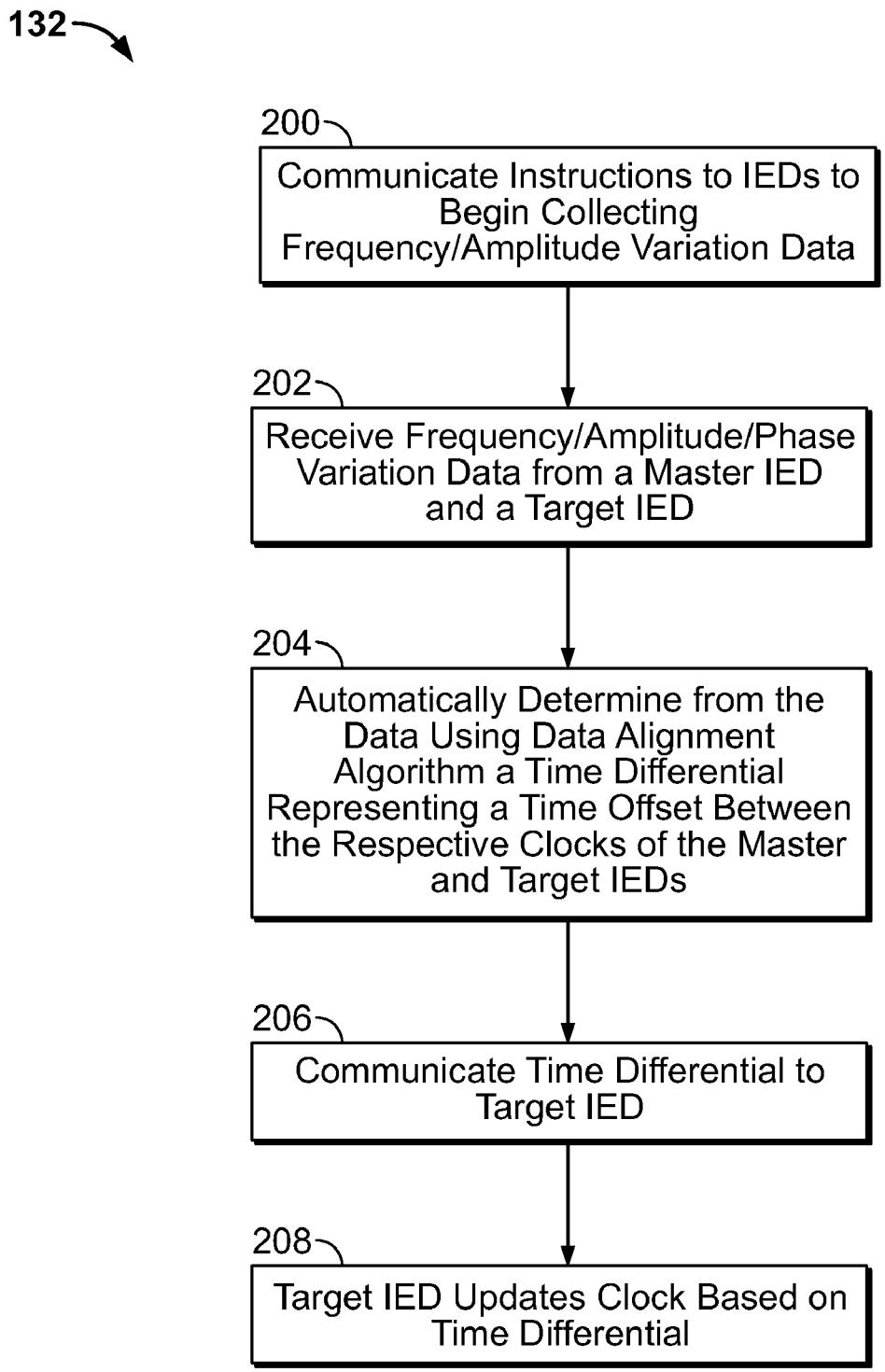
FIG. 2 is a flow chart of a clock synchronization algorithm according to an aspect of the present disclosure.

With reference to FIG. 2, the controller 102 communicates an instruction to the master IED 104 and the IEDs 112-124 to begin collecting data indicative of frequency or amplitude or phase variations needed for the data alignment algorithm 128, 130 (200). Preferably, the IEDs 112-124 store data indicative of variations in the fundamental frequency, because this frequency remains unchanged throughout the system. Alternately, the master IED 104 communicates an instruction to the IEDs 112-124 to begin collecting frequency or amplitude or phase variation data. The controller 102 receives the frequency or amplitude or phase variation data from the master IED 104 and from the IEDs 112-124 (202). The controller 102 executes the data alignment algorithm 128 to determine a point of alignment between the frequency or amplitude or phase variation data from the master IED 104 and one of the IEDs 112-124 (204). In one example, a cycle count offset is determined by the data alignment algorithm 128, and this cycle count offset is converted into a corresponding time based upon the period of each cycle (typically about 60 Hz in North America). The time corresponding to the cycle count offset between the point of alignment between the two data sets is the time difference between the two clocks. The controller 102 communicates this time differential, which can be a positive or a negative number, via the network 106 to the target IED (e.g., IED 114) (206), and the target IED 114 adjusts its clock 126 by the time differential (208). As a result, the clock 126 of the IED 114 and the clock 110 of the master IED 104 are synchronized to the same absolute time reference.

Figure 3:
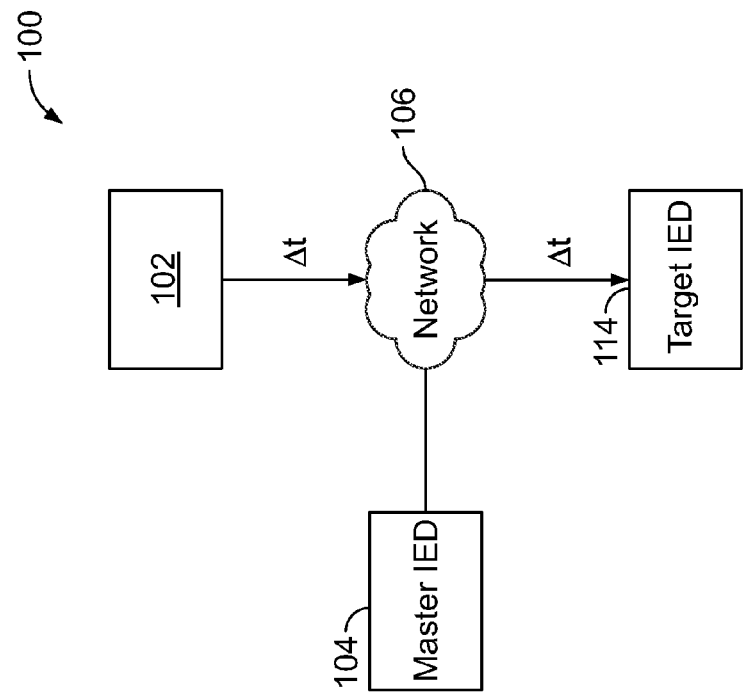
FIG. 3 illustrates a differential time synchronization example showing two curves and how the time differential is communicated from a controller to a target IED whose clock needs to be synchronized with a master clock.
Figure 3:
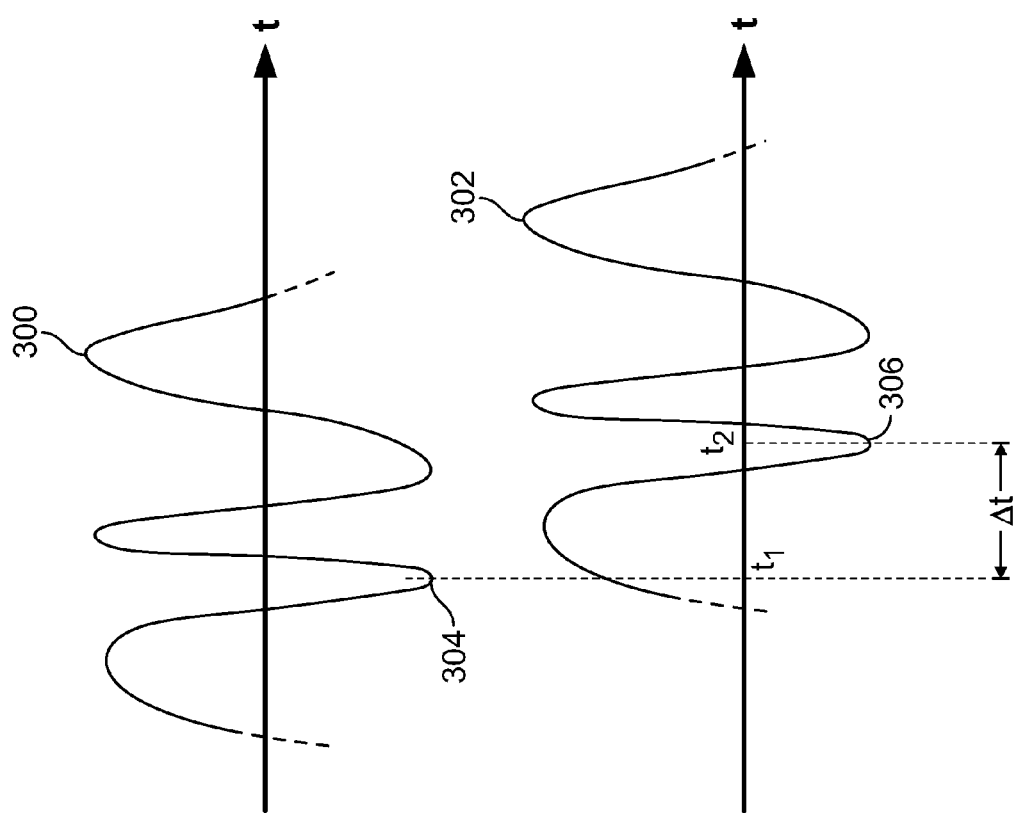

In FIG. 3, a differential time synchronization example is illustrated showing two curves 300, 302. The curve 300 represents frequency variation data from the master IED 104, and the curve 302 represents frequency variation data from the target IED 114. Due to delays and other latencies in the monitoring system 100, the IEDs 104, 114 do not receive time synchronization commands at the same moment in time. This can result in a difference in the time indicated by the clock in IED 104 and the clock in IED 114. As a result of this time difference, IED 104 records a frequency variation at time t1, whereas IED 114 records that same frequency variation at a later time, t2. In an embodiment, these times can be stamped within each IED with a corresponding cycle count, which represents the number of times the IED has recorded a zero crossing (positive or negative going) in the measured signal that is indicative of a characteristic of the utility being monitored by the monitoring system 100. The data alignment algorithm 128, 130 finds this point of correlation (points 304, 306 on the curves 300, 302), and produces data indicative of these two points (such as a time reference or a cycle count). The controller 102 (or the IED 114 in implementations where the data alignment algorithm 130 is executed in the IED 114) determines from these points 304, 306 a time differential, Δt, by subtracting the time references corresponding to the two points or determining an offset between the respective cycle counts from the IEDs 104, 114 and calculating a corresponding time differential from the offset based upon the known periodicity of the cycles. For example, if the cycle count offset is 60, such that one IED needs to advance or retard its clock by 60 cycles, and the fundamental frequency is 60 Hz, then the time differential Δt is one second. This time differential Δt is communicated from the controller 102 to the target IED 114, which adjusts its clock 126 accordingly. Note that Δt can be positive or negative, depending upon whether the clock 126 leads or lags the clock 110 of the master IED 104. Alternately, the controller 102 can send the cycle count offset (in this example, 60) directly to the IED 104, which looks at the sign of the offset and adjusts its clock accordingly. For example, a positive 60 cycles would cause the IED 104 to advance its clock by 1 second; a negative 60 cycles would cause the IED 104 to decrement its clock by 1 second.

The period of time for collecting the frequency/amplitude/phase variation data (referred generally as "variation data") should be at least equal to the delay in the network 106 between the master IED 104 and the target IED 114 plus the amount of time needed to obtain correlation using the data alignment algorithm 128 between the variation data collected by the IEDs 104, 114 to the required accuracy. If the time period of collection is too small, the controller 102 will not be able to locate a point of correlation in the variation data. Conventional algorithms can be used to determine the approximate communication delay through the network 106 and to adjust the time period of collection accordingly. Without this adjustment, a larger set of variation data would be required from the IEDs, consuming bandwidth through the network.

As mentioned above, the data alignment algorithm 130 can be stored in and executed by IED 114. In this example, the master IED 104 and the other IEDs 112, 116-124 in the monitoring system 100 communicate their respective variation data across the network 106 to the IED 114. Note that more than one IED in the system 100 can execute the data alignment algorithm. The IED 114 executes the correlation sequence algorithms from the data alignment algorithm 130 against its own variation data that the IED 114 has collected locally to calculate the required time correction. Advantageously, local execution in the IEDs of the data alignment algorithm 130 reduces bandwidth in the network 106 as the data needed to run the correlation algorithms need not be communicated among each IED that requires time synchronization and also allows the IEDs to be time synchronized simultaneously. In other words, when the data alignment algorithm 128 is executed by the controller 102, two sets of variation data need to be communicated from the master IED 104 and the target IED. When the data alignment algorithm 130 is executed locally at the IED 114, only one set of variation data needs to be communicated from the master IED 104 to the IED 114.

The raw frequency/amplitude/phase variation data can be resampled to a smaller time interval, so instead of using one cycle frequency measurements, for example, a half cycle (or any larger or smaller period) frequency measurements can be used. Resampling the variation data to a smaller time interval advantageously (1) increases the number of points that the correlation algorithms in the data alignment algorithm use and thus helps to increase the precision of the time differential calculation; (2) allows the use of IEDs with different sampling rates in the monitoring system 100; and (3) reduces the number of points used in the correlation calculations to allow the controller 102 to determine what ranges of raw sample sets have high correlation and then to focus detailed correlation calculations on those specific ranges.

First, by increasing the number of points that the correlation algorithms use, a more precise time differential can be calculated because a smaller sample period increases the accuracy of the calculated time difference. Second, IEDs with different sampling rates can reduce the cost of the monitoring system 100 as a whole. For example, assume a basic IED with a frequency sampling/calculation rate of once every four cycles versus a more advanced IED with a calculation rate of once every cycle. By resampling the four-cycle capable device, its variation data is resampled to one sample point per cycle. Without resampling, the raw variation data, only every fourth cycle sample point could be used from the more capable IED. With resampling, the variation data from the less capable, four cycle device is resampled to one sample point for each cycle and these sample points can be correlated one-to-one with the more capable device directly. For a device that samples once every four cycles, the step size of the time differential is about 66.6 milliseconds (for a 60 Hz system), whereas the step size is about 16.6 milliseconds for a device that samples once per cycle. Third, by reducing the number of points, the computational complexity of running the correlation algorithms is reduced by performing the high-resolution calculations on a subset of the raw variation data samples. Thus, these calculations can be performed on cheaper, less capable IEDs, which reduces the overall cost of the monitoring system 100. Sections of the variation data from both sample sets that are highly correlated are identified, and those sections are resampled to smaller time domain steps to increase the absolute time accuracy of the individual cycles. As a result, the accuracy of the time differential measurement between a pair of IEDs is increased.

Resampling involves calculating intermediate samples between the measured samples of the raw variation data. As those of ordinary skill in the art will appreciate, resampling is essentially an interpolation technique that estimates with varying levels of accuracy where missing samples would occur. Any one of numerous conventional resampling algorithms can be used for this purpose with various tradeoffs between the amount of CPU cycles required for the calculations, changes to the frequency spectrum of the sample set, and changes to the time domain values.

In a further implementation, the controller 102 or one of the IEDs in the monitoring system 100 tracks what time offsets have historically been sent to a particular IED in the monitoring system 100. In this manner, the controller 102 or the IED can calculate an error rate of a clock and automatically apply a corrective factor to the clock to compensate independent of the differential time synchronization algorithm 132. As the monitoring system 100 builds a database of historical offsets (time differential values) that have been sent to a particular device, the clock drift can be estimated with increasing accuracy, assuming that the conditions causing the clock drift do not change. As a result, fewer time corrections need to be sent to an IED over time, and the size and frequency of required time corrections will diminish over time. Fewer time corrections advantageously consumes less bandwidth and processing power to maintain the accuracy of an IED's clock within an acceptable error tolerance. Reducing the size and frequency of time corrections advantageously causes fewer discontinuities to occur in an IED's clock over time. Discontinuities can cause significant accuracy issues in IEDs measuring time-dependent parameters such as energy or power. Any accuracy issues with energy or power measurements can result in lost revenue for market segments such as utilities.

Figure 4:
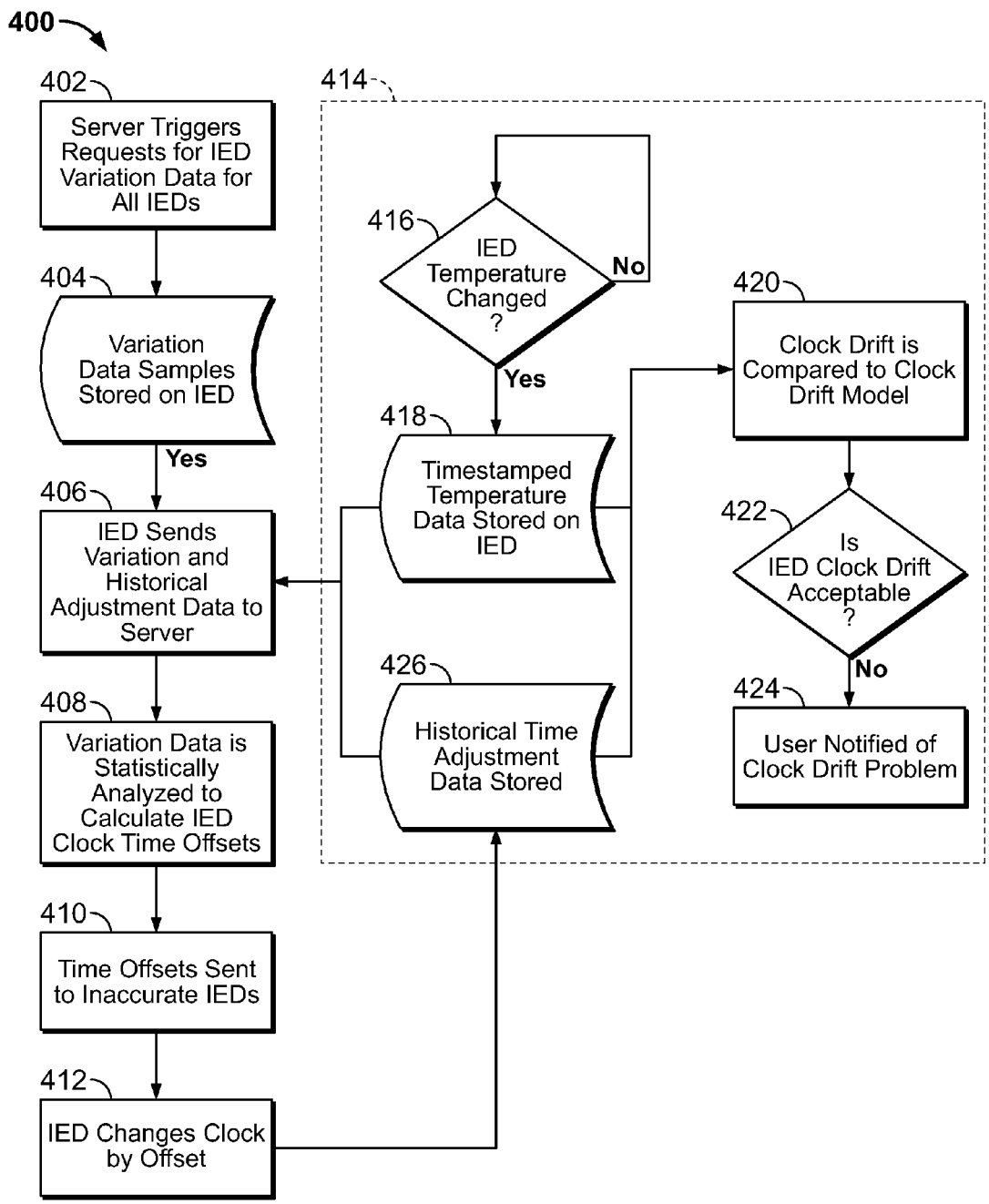
FIG. 4 is a flow chart of an exemplary differential time synchronization algorithm that includes optional algorithms for further increasing the short- and long-term accuracy of the time correction.

FIG. 4 is an exemplary differential time synchronization algorithm 400 that includes optional algorithms for further increasing the short- and long-term accuracy of the time correction. The DTS algorithm 400 can be part of the DTS module 132 and stored with the controller 102 or in the IED 114. The DTS algorithm 400 collects diagnostic data to provide an indication as to when an IED's clock is drifting out of defined specifications so that the IED can be serviced or replaced before the clock drift becomes unacceptably high.

The server (controller 102) triggers requests from the IEDs 112-124 for their respective variation data to be correlated in the monitoring system 100 (402). How often the controller 102 triggers these requests can be based upon the time the last time differential was communicated. A simple method is for the controller 102 to trigger these requests on a periodic basis. Preferably, the controller 102 calculates when the uncorrected clock drift, based on previous executions, will be large enough to warrant a correction. Over time, as the IED is characterized more accurately, this period can be increased to an amount proportional to the total of the uncharacterized errors. The variation data samples to be correlated are stored on each IED 112-124 (404). The IED sends its variation data to be correlated and optionally its historical adjustment data to the server (controller 102) (406). The historical adjustment data corresponds to a historical account of the time differential values by which that IED's clock has been adjusted. The variation data from pairs of IEDs are analyzed statistically to find relevant correlations between the points in the variation data samples and a clock time offset is calculated from the respective points of correlation (408). The corresponding time offsets are sent to the IEDs whose clocks need to be adjusted (410). The IED changes its clock by an amount corresponding to the offset (time differential) (412).

In the optional algorithm 414, the IED temperature and clock drift are monitored to evaluate a clock drift in the IED's clock. The algorithm 414 stores the time-stamped temperature value in a memory of the IED (418) periodically or based upon whether the IED's temperature has changed from the last stored value by some predetermined amount (416). The temperature value can be used by the DTS algorithm 132 to make further adjustments to the time differential sent to a target IED. Each time a time differential is communicated to the IED, the algorithm 414 stores the time differential value in the memory of the IED for later retrieval and analysis (426). The algorithm 414 analyzes the clock drift over time and compares the clock drift against a conventional clock drift model (420). Based on this comparison, the algorithm 414 determines whether the clock drift is acceptable (422), and, if not, notifies the user of a problem with the clock drift (424) by displaying an indication of such on a conventional video display (not shown) coupled to the controller 102 or by communicating an electronic message, such as an email, text message, or pager message, to a remote device. The indication informs the user about the need to replace the IED or to service it. This determination can be based on the time offsets, the date and time that they occurred, the temperature of the IED, and the clock adjustments made by the IED from the clock model. This optional algorithm 414 helps to avoid gradual and sudden degradation of the IED clock.

In an alternate embodiment, the IEDs 112-124 continually compare clock drift over time against a conventional clock drift model to determine a drift correction factor required to maintain the accuracy of the IEDs' clock. The IEDs 112-124 apply the drift correction factor to the clock in order to minimize clock drift, therefore minimizing the frequency of time corrections required from the controller 102. Temperature can have an impact on clock drift, and the IED temperature can be incorporated into the conventional clock drift model.

It should be noted that the algorithms 128, 130, 132 illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Although a controller 102 is shown and described as carrying out various functions, it should be understood that any of these functions can be carried out by the master IED 104 or any of the IEDs 112-124 shown in FIG. 1. Likewise, any of the functions carried out by the master IED 104 or by any of the IEDs 112-124 can be carried out by the controller 102, such as the DTS algorithm 132.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

What is claimed is:

1. A method of synchronizing respective clocks of intelligent electronic devices (IEDs) in a utility monitoring system, comprising:
   receiving, at a controller over a network, respective signal data representing frequency or amplitude or phase variations in a characteristic of a utility measured by each of a master IED and a target IED;
   automatically determining, based on a correlation algorithm applied to the signal data from the master and target IEDs, a difference between a first occurrence of a point in the signal data measured from the master IED and a second occurrence of the same point in the signal data measured from the target IED;
   determining, based on the difference, time differential data indicative of a time amount by which a target clock of the target IED leads or lags a master clock of the master IED;
   communicating the time differential data to the target IED to cause the target IED to adjust the target clock by the time amount;
   determining whether a temperature of the target IED has changed compared to a previous temperature reading; and
   if the determining whether the temperature has changed results in a temperature change, adjusting the target clock based on the temperature change.

2. The method of claim 1, wherein the difference is a time difference, the first occurrence corresponds to a first time, and the second occurrence corresponds to a second time that is earlier or later than the first time.

3. The method of claim 1, wherein the difference is a cycle count difference, the first occurrence corresponds to a first cycle count, and the second occurrence corresponds to a second cycle count that is different from the first cycle count, a cycle count representing a number of full cycles measured by a corresponding one of the IEDs of a periodically changing characteristic of the utility being monitored.

4. The method of claim 3, wherein the periodically changing characteristic is current or voltage.

5. The method of claim 1, wherein the utility monitoring system is a power monitoring system, and wherein the target IED is a power meter.

6. The method of claim 1, wherein the controller is in the master IED.

7. The method of claim 1, further comprising resampling, at a rate faster or slower than a rate that the signal data is sampled, the signal data measured by the target IED to produce resampled signal data, wherein the automatically determining is carried out based on a correlation algorithm applied to the resampled signal data from the target IED and the signal data from the master IED.

8. The method of claim 1, further comprising:
storing a plurality of historical time differential data communicated to the target IED and determining therefrom an error rate of the clock of the target IED; and
at the target IED, automatically compensating the clock as a function of the error rate.

9. The method of claim 1, further comprising comparing a clock drift of the target clock or the master clock to a clock drift model;
responsive to the comparing resulting in the clock drift exceeding a threshold, providing an indication of the clock drift.

10. The method of claim 1, further comprising adjusting the target clock or the master clock based on a clock drift model that incorporates an ambient temperature of the target clock or the master clock.

11. The method of claim 1, wherein the correlation algorithm includes:
computing correlation coefficients each produced by a cross-correlation algorithm based on at least part of the first and second signal data until one of the correlation coefficients produced by the cross-correlation algorithm satisfies a criterion; and
in response to the one of the correlation coefficients satisfying the criterion, associating the first occurrence of the point in the first signal data with the second occurrence of the same point in the second signal data at the point at which the correlation coefficient satisfies the criterion.

12. The method of claim 1, wherein the correlation algorithm includes:
computing correlation coefficients each produced by a cross-correlation algorithm based on at least part of the first and second signal data until one of the correlation coefficients produced by the cross-correlation algorithm satisfies a criterion; and
in response to the one of the correlation coefficients satisfying the criterion, associating the first occurrence of the point in the first signal data with the second occurrence of the same point in the second signal data at the point at which the correlation coefficient satisfies the criterion.

13. A method of synchronizing respective clocks of intelligent electronic devices (IEDs) in a power monitoring system, wherein one of the IEDs is a master IED, comprising:
receiving, at the master IED, master time information from a time source;
storing, in a memory of the master IED, the master time information;
receiving, at a controller over a network, respective signal data representing frequency or amplitude or phase variations in a current or voltage measured by the master IED and another of the IEDs termed a target IED;
automatically determining, based on a data alignment algorithm applied to the signal data from the master IED and the target IED, a time difference between a first time occurrence of a point in the signal data measured from the master IED and a second time occurrence of the same point in the signal data measured from the target IED, the time difference representing a time amount by which a target clock of the target IED leads or lags the master time information from the time source;
communicating the time difference to the target IED to cause the target IED to adjust a clock in the target IED by the time amount;
determining whether a temperature of the target IED has changed compared to a previous temperature reading.
if the determining whether the temperature has changed results in a temperature change, inputting the temperature change into a clock drift model; and
adjusting the clock of the target IED based on the clock drift model.

14. The method of claim 13, wherein the controller is in the first IED.

15. The method of claim 13, wherein the time source is a global positioning system.

16. The method of claim 13, further comprising resampling, at a rate faster than a rate that the signal data is sampled, the signal data measured by the target IED to produce resampled signal data, wherein the automatically determining is carried out based on the correlation algorithm applied to the resampled signal data from the master IED and the signal data from the target IED.

17. The method of claim 13, further comprising:
storing a plurality of historical time differences communicated to the target IED and determining therefrom an error rate of the clock of the target IED; and
at the target IED, automatically compensating the clock as a function of the error rate.

18. The method of claim 13, further comprising
comparing a clock drift of the clock of the target IED to a clock drift model;
responsive to the comparing resulting in the clock drift exceeding a threshold, displaying on a video display an indication of the clock drift.

19. A method of synchronizing respective clocks of intelligent electronic devices (IEDs) in a power monitoring system, wherein one of the IEDs is a master IED, comprising:
receiving, at the master IED, master time information from a time source;
storing, in a memory of the master IED, the master time information;
receiving, at a controller, respective signal data representing frequency variations in a current or voltage measured by the master IED and another of the IEDs termed a target IED;
automatically determining, based on a data alignment algorithm applied to the signal data from the master IED and the target IED, a time difference between a first occurrence of a point in the signal data measured from the master IED and a second occurrence of the same point in the signal data measured from the target IED;
communicating time differential data indicative of the time difference to the target IED to cause the target IED to adjust a clock by a time amount corresponding to the time differential data;
determining whether a temperature of the target IED has changed compared to a previous temperature reading;
if the determining whether the temperature has changed results in a temperature change, inputting the temperature change into a clock drift model; and
adjusting the clock of the target IED based on the clock drift model.

* * * * *